(12) United States Patent
Yamamoto

(10) Patent No.: US 7,583,813 B2
(45) Date of Patent: Sep. 1, 2009

(54) EMBEDDING DATA REPRODUCE APPARATUS

(75) Inventor: Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 764 days.

(21) Appl. No.: 11/236,758

(22) Filed: Sep. 28, 2005

(65) Prior Publication Data
US 2007/0071279 A1    Mar. 29, 2007

(51) Int. Cl.
*G06K 9/00*    (2006.01)
(52) U.S. Cl. .................................. 382/100
(58) Field of Classification Search .............. 382/100
See application file for complete search history.

(56) References Cited

U.S. PATENT DOCUMENTS 5,848,155 A * 12/1998 Cox ........................ 382/191
6,741,758 B2 * 5/2004 Hayashi et al. ............ 382/294
2004/0001606 A1 * 1/2004 Levy ......................... 382/100

FOREIGN PATENT DOCUMENTS

| JP | 11-032205 A | 2/1999 |
| JP | 2004-289783 A | 10/2004 |

OTHER PUBLICATIONS

U.S. Appl. No. 11/236,802, filed Sep. 28, 2005, Yamamoto.

* cited by examiner

*Primary Examiner*—Tom Y Lu
(74) *Attorney, Agent, or Firm*—Foley & Lardner LLP

(57) ABSTRACT

An image having embedded data embedded therein is read to output an image signal, spectral analysis is executed for the image signal, and the embedded data embedded in the image signal is extracted based on a result of the spectral analysis and preset data.

20 Claims, 8 Drawing Sheets

| k | uk | vk |
|---|---|---|
| 1 | 100 | 0 |
| 2 | 71 | 71 |
| 3 | 0 | 100 |
| 4 | -71 | 71 |
| 5 | 150 | 0 |
| 6 | 130 | 75 |
| 7 | 75 | 130 |
| 8 | 0 | 150 |
| 9 | -75 | 130 |
| 10 | -130 | 75 |
| 11 | 193 | 52 |
| 12 | 141 | 141 |
| 13 | 52 | 193 |
| 14 | -52 | 193 |
| 15 | -141 | 141 |
| 16 | -193 | 52 |

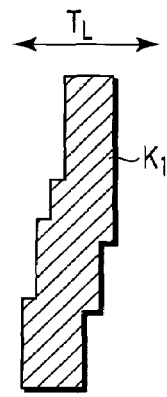 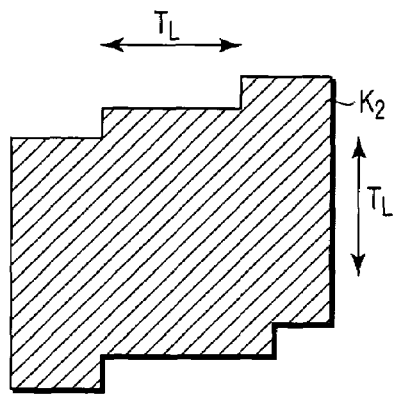
FIG. 7A  FIG. 7B
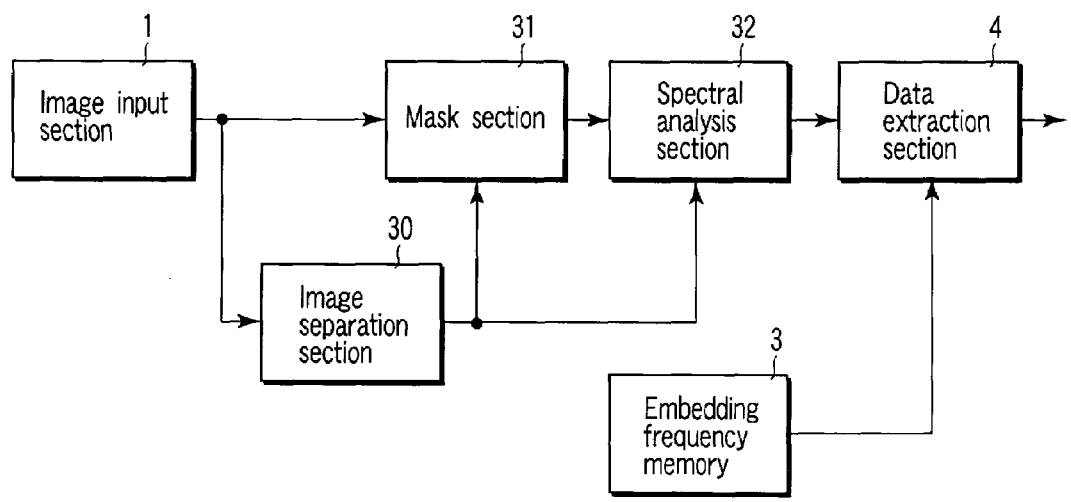
FIG. 8

| k | u1k | v1k | u2k | v2k |
|---|-----|-----|-----|-----|
| 1 | 100 | 0 | 0 | 100 |
| 2 | 71 | 71 | -71 | 71 |
| 3 | 150 | 0 | 0 | 150 |
| 4 | 130 | 75 | -75 | 130 |
| 5 | 75 | 130 | -130 | 75 |
| 6 | 193 | 52 | -52 | 193 |
| 7 | 141 | 141 | -141 | 141 |
| 8 | 52 | 193 | -193 | 52 |

EMBEDDING DATA REPRODUCE APPARATUS

BACKGROUND OF THE INVENTION

1. Field of the Invention

The present invention relates to an embedded data reproduction apparatus for reproducing data embedded in an image.

2. Description of the Related Art

Superimposition of other data on an image enables recording of secondary data or prevention of falsification, forgery or the like. For example, technologies of superimposing other data on an image are disclosed in Jpn. Pat. Appln. KOKAI Publications Nos. 11-32205 and 2004-289783. Jpn. Pat. Appln. KOKAI Publication No. 11-32205 discloses the technology of adding data as much as possible without degrading image quality and surely detecting the added data. Jpn. Pat. Appln. KOKAI Publication No. 2004-289783 discloses the technology of selecting and reversing, e.g., an image alone to embed watermark data, and reversing positive and negative luminance values to extract the watermark data.

BRIEF SUMMARY OF THE INVENTION

In accordance with a main aspect of the present invention, an embedded data reproduction apparatus comprises an image input section for reading an image having embedded data embedded therein, and outputting an image signal of the image, a spectral analysis section for executing spectral analysis for the image signal output from the image input section, and a data extraction section for extracting the embedded data embedded in the image signal based on a result of the spectral analysis by the spectral analysis section and preset data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7A is a diagram showing a determination example of a black area not determined to be a halftone area;

FIG. 7B is a diagram showing a determination example of a black area determined to be a halftone area;

FIG. 8 is a block diagram showing an embedded data reproduction apparatus according to a third embodiment of the present invention;

DETAILED DESCRIPTION OF THE INVENTION

A first embodiment of the present invention will be described below with reference to the accompanying drawings.

Figure 1:
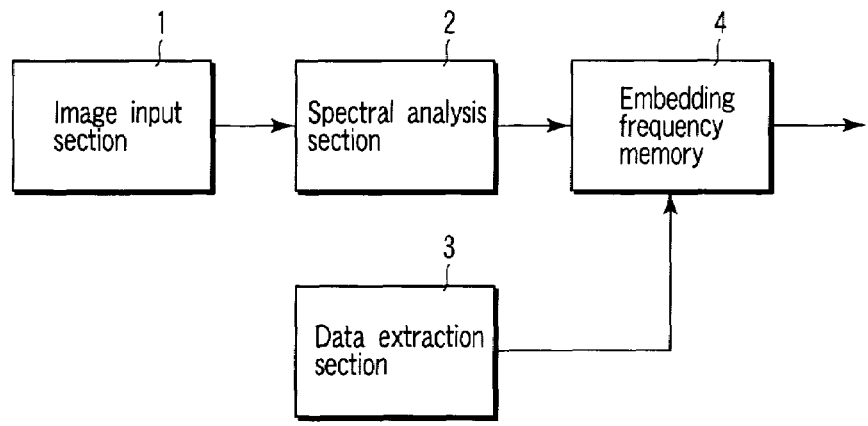
FIG. 1 is a block diagram showing an embedded data reproduction apparatus according to a first embodiment of the present invention.

FIG. 1 is a block diagram of an embedded data reproduction apparatus. An image input section 1 reads an image having embedded data embedded therein, and outputs an image signal of the image. For example, the image input section 1 has a scanner or the like.

Figure 2:
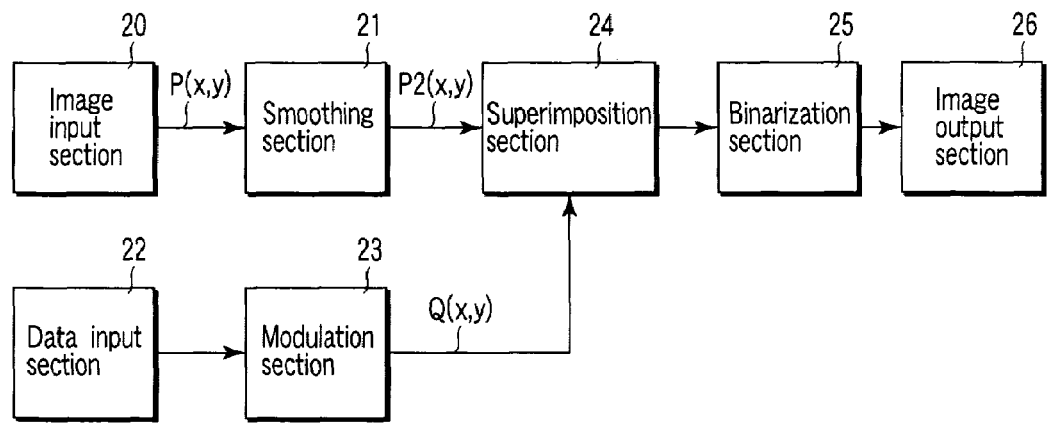
FIG. 2 is a block diagram of a data embedding device.

Now, description will be made of an image having embedded data embedded therein to be a premise for reproduction carried out by the embedded data reproduction apparatus. FIG. 2 is a block diagram of a data embedding device. An image input section 20 inputs an image as an image signal P (x, y). For example, the image input section 1 has a scanner. The scanner reads, e.g., an image recorded on a sheet as an image recording medium, and outputs an image signal P (x, y).

A smoothing section 21 smoothes the image signal P (x, y) output from the image input section 20.

A data input section 22 inputs embedded data to be embedded in the image signal P (x, y) input from the image input section 20. For example, the embedded data is represented as a finite-bit digital signal. According to the embodiment, the embedded data is, e.g., a 16-bit digital signal.

A modulation section 23 generates s superimposed signal Q (x, y) having the embedded data from the data input section 22 superimposed therein. For example, the modulation section 23 generates the superimposed signal Q (x, y) by stacking 2-dimensional sine waves of 16 kinds of spatial frequencies. The superimposed signal Q (x, y) is generated by the following equation (1):

$$Q(x, y) = \text{clip}\left(A \cdot \sum_{k} fk \cdot \cos(2\pi(uk \cdot x + vk \cdot y))\right) \quad (1)$$

wherein x, y are pixel coordinate values on an image, Q (x, y) is a value of a superimposed signal of the coordinates x, y, uk, vk are k-th frequency components, fk is a kbit-th value of the embedded data, and fk=0 or 1 is established. For k, $0 \leq k \leq -5$ is established.

A is strength of the superimposed signal Q (x, y). It is presumed here that maximum strength of the image signal P (x, y) is 1, and A=0.2 is established. Additionally, clip x) is a function of clipping a value within ±0.5. The clip (x) is represented by the following equations (2) to (4):

if (x<−0.5) clip (x)=−0.5     (2)

if (x>0.5) clip (x)=0.5     (3)

if (0.5>x>−0.5 clip (x)=x     (4)

The uk, vk are k-th frequency components of embedding sine waves. The uk, vk may be set to optional values.

Figures 3, 4:
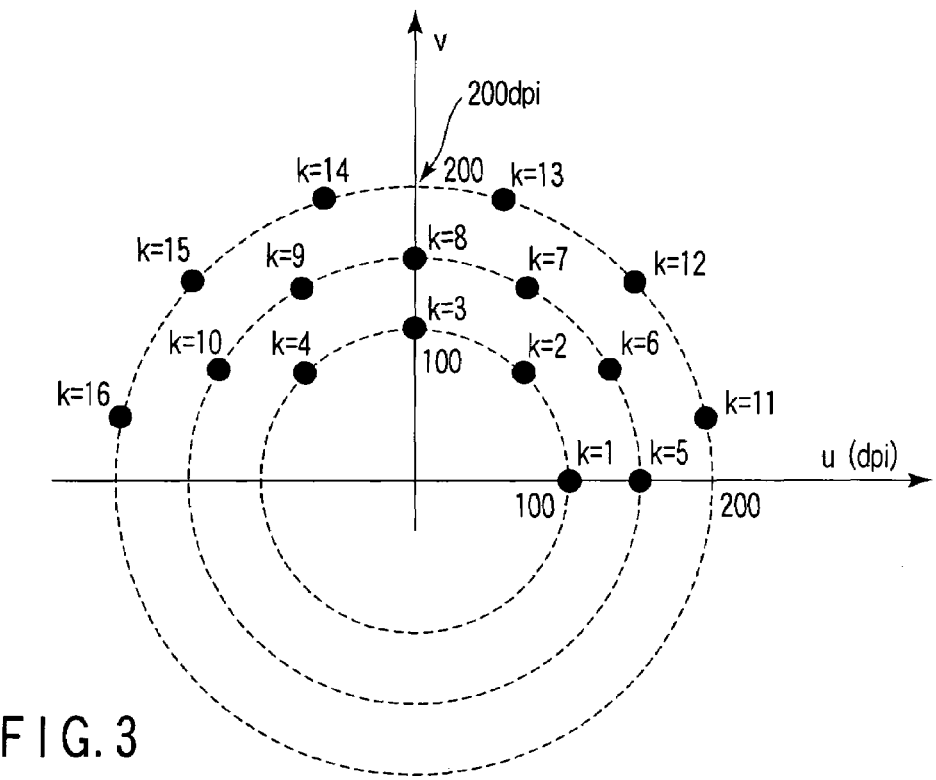
FIG. 3 is an arrangement diagram showing frequency components of sine waves of embedded data.
FIG. 4 is a table showing correspondence between the frequency components of the sine waves of the embedded data.

FIG. 3 is an arrangement diagram of k-th frequency components uk, vk of embedding sine waves on uv coordinates. In the arrangement of the frequency components, a frequency distribution is symmetrical about an origin. Thus, areas (third, fourth image limits) of v<0 are omitted. FIG. 4 shows correspondence between the frequency components uk, vk.

A superimposition section 24 adds the superimposed signal Q (x, y) generated by the modulation section 23 to an edge of an image signal $P_2$ (x, y) smoothed by the smoothing section 21.

A binarization section 25 binarizes the image signal to which the superimposed signal Q (x, y) has been added, and adds a concave and convex shape to the edge in accordance with the embedded data.

An image output section 26 outputs the image signal binarized by the binarization section 25. For example, the binarized image signal output from the image output section 26 is stored in a hard disk or the like, or directly printed on an image recording medium by a printer. For the image printed on the image recording medium, a concave and convex shape is added to the edge of the image signal P (x, y) in accordance with the embedded data.

Figure 5:
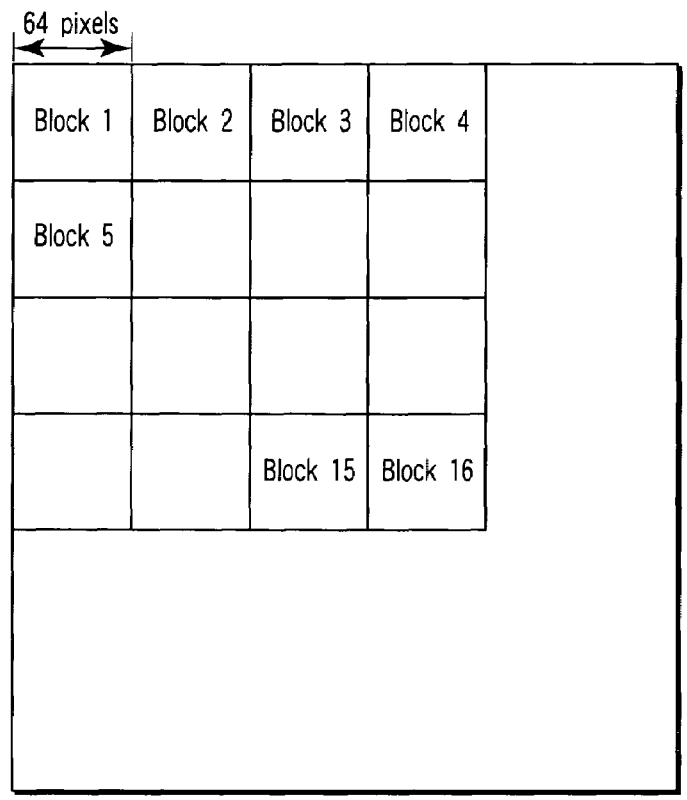
FIG. 5 is a schematic diagram showing each block for which spectral analysis is carried out by a spectral analysis section of the embedded data reproduction apparatus.

In FIG. 1, the spectral analysis section 2 executes spectral analysis for the image signal output from the image input section 1. First, as shown in FIG. 5, the spectral analysis section 2 divides an image of the image signal into a plurality of blocks, e.g., 16 blocks "1" to "16". Each of the blocks "1" to "16" is a square of, e.g., 63 pixels×64 pixels. Next, the spectral analysis section 2 executes spectral analysis, i.e., Fourier transformation, for an image of each of the blocks "1" to "16". Then, the spectral analysis section 2 calculates a square of an absolute value for each frequency which is a result of the Fourier transformation. For example, spectral Fi (u, v) is represented by the following equations (5) and (6) in which pi (x. y) is a pixel value of a plotter:

$$fi(u, v) = \sum_{k}\sum_{l} p(x, y) \cdot \exp(-2\pi j(kx + 1y))$$    (5)

$$Fi(u, v) = |fi(u, v)|^2$$    (6)

wherein j is an imaginary unit, and |a| is an absolute value of a.

For the blocks "1" to "16", an average value F (u, v) is calculated for each of the calculated spectral frequencies. The average value F (u, v) is represented by the following equation (7):

$$F(u, v) = \sum_{i} Fi(u, v)/16$$    (7)

The spectral analysis section 2 outputs a calculation result of the average value F (u, v) as a spectral signal. For example, the spectral analysis section 2 calculates spectral analysis by an FFT or the like at a high speed. The spectral analysis section 2 may be constituted of hardware dedicated to spectral analysis. In this case, by using the FFT, the spectral analysis section 2 can be realized by a relatively small circuit size.

An embedding frequency memory 3 stores a parameter used for embedding in the image, i.e., spatial frequency data used for embedding the embedded data in the image, as known information. In other words, for example as shown in FIGS. 3 and 4, the embedding frequency memory 3 stores spatial frequency data (uk, vk) of 16 groups in a table form.

A data extraction section 4 extracts the embedded data embedded in the image signal based on a result of the spectral analysis by the spectral analysis section 2 and the spatial frequency data (uk, vk) stored in the embedding frequency memory 3.

The data extraction section 4 reads the spatial frequencies (uk, vk) from the embedding frequency memory 3 in accordance with k (k=1 to 16), and obtains spectral signals F (uk, vk) for the read spatial frequencies (uk, vk). The data extraction section 4 compares the spectral signals F (uk, vk) with a predetermined threshold value T. As a result of the comparison, the data extraction section 4 sets data to "1" if the spectral signals F (uk, vk) are larger than the threshold value T, and to "0" if smaller. Then, the data extraction section 4 arrays 16 data "1" or "0" of k=1 to 16 to reproduce 16-bit embedded data. The embedded data can be represented as a 2-byte signal. Accordingly, the data extraction section 4 outputs the embedded data as a 2-byte signal.

The threshold value T is constant irrespective of k. However, it may be changed depending on k. For example, the threshold value T is set smaller as values of uk, vk are farther from the origin. A general scanner has characteristics of lower reading response as a spatial frequency is higher. Accordingly, the general scanner tends to have a lower spectrum when a frequency is higher. As a result, for example, by setting the threshold value T to be smaller as the values of uk, vk are farther from the origin, it is possible to compensate for the tendency of the general scanner to be lower in spectrum when a frequency is higher.

Next, the reproducing operation of the embedded data by the apparatus thus configured will be described.

The image input section 1 reads an image having embedded data embedded therein. For example, the image has been printed on an image recording medium. In the image, a concave and convex shape is added to an edge such as a segment in accordance with the embedded data. The image input section 1 outputs an image signal of the read image.

The spectral analysis section 2 receives the image signal output from the image input section 1. As shown in FIG. 5, the spectral analysis section 2 divides the image of the image signal into a plurality of blocks, e.g., 16 blocks of "1" to "16". Next, the spectral analysis section 2 executes Fourier transformation for pixels of the blocks "1" to "16".

Next, the spectral analysis section 2 calculates a square of an absolute value for each frequency which is a result of the Fourier transformation by the equations (5) and (6). Subsequently, for the blocks "1" to "16", the spectral analysis section 2 calculates an average value F (u, v) for each of the calculated spectral frequencies by the equation (7). The spectral analysis section 2 outputs a calculation result of the average value F (u, v) as a spectral signal.

The data extraction section 4 reads the spatial frequencies (uk, vk) from the embedding frequency memory 3 in accordance with k (k=1 to 16), and obtains spectral signals F (uk, vk) for the read spatial frequencies (uk, vk).

Next, the data extraction section 4 compares the spectral signals F (uk, vk) output from the spectral analysis section 2 with a predetermined threshold value T. As a result of the comparison, the data extraction section 4 sets data to "1" if the spectral signals F (uk, vk) are larger than the threshold value T. The data extraction section 4 sets data to "0" if the spectral signals F (uk, vk) are smaller than the threshold value T.

Then, the data extraction section 4 arrays 16 data "1" or "0" of k=1 to 16 to reproduce 16-bit embedded data. The embedded data can be represented as a 2-byte signal. Accordingly, the data extraction section 4 outputs the embedded data as a 2-byte signal.

As described above, according to the first embodiment, the image input section 1 reads the image having the embedded data embedded therein, the spectral analysis section 2 executes the spectral analysis for the image signal P (x, y), and the data extraction section 4 extracts the embedded data embedded in the image signal P (x, y) based on the result of the spectral analysis by the spectral analysis section 2 and the spatial frequency data stored in the embedded data frequency memory 3. Therefore, by simple processing, it is possible to reproduce the embedded data from the image in which the concave and convex shape is added to the edge such as a segment in accordance with the embedded data.

The image input section 1, the spectral analysis section 2, and the data extraction section 4 are realized by executing software by a CPU. As a result, reproduction of the embedded data from the image can be executed within a short processing time. A circuit size can be reduced if each processing of the image input section 1, the spectral analysis section 2, and the data extraction section 4 is realized by dedicated software.

Next, a second embodiment of the present invention will be described with reference to the drawings. Sections similar to those of FIG. 1 are denoted by similar reference numerals, and detailed description thereof will be omitted.

Figure 6:
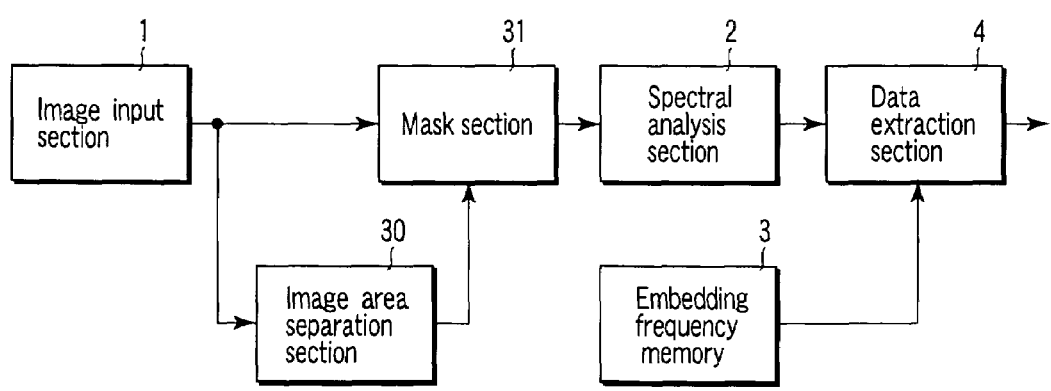
FIG. 6 is a block diagram showing an embedded data reproduction apparatus according to a second embodiment of the present invention.

FIG. 6 is a block diagram of an embedded data reproduction apparatus. This embedded data reproduction apparatus reproduces embedded data from an image such as a chart or a photo having a halftone.

An image separation section 30 extracts a halftone area. The halftone area is an image area such as a chart or a photo in which a tone is represented by halftone dots. Some halftone area separation methods are available. According to the embodiment, for example, a method by smearing is used.

First, the image separation section 30 binarizes an image signal P (x, y) by a proper predetermined threshold value Th. In other words, a pixel whose value is equal to or less than the predetermined threshold value Th is set to a black level "0". A pixel equal to or more than the predetermined threshold value Th is set to a white level "1". A binary image obtained by the binarization is set to Q (x, y). The binarization processing is represented by the following equations:

$$\text{if } (P(x) \geq Th) Q\&x) = 1 \tag{8}$$

$$\text{if } (P(x) < Th) Q(x) = 0 \tag{9}$$

Next, the image separation section 30 expands the pixel of the black level "0" by a predetermined number N of pixels in four longitudinal and horizontal directions. Its result is set to Q2 (x, y). That is, when a given pixel is a pixel of a black level "0", each of the number N of pixels in four up-and-down and left-and-right directions is changed to a pixel of a black level "0" for the pixel. For example, a processing example in the case of the predetermined number of pixels N=2 is represented by the following equation:

If $(Q(x-2, y)=0)$ or $(Q,(x-1, y)=0)$ or $(Q(x, y)=0)$ or $(Q(x+1, y)=0)$ or $(Q(x+2, y)=0)$ or $(Q(x, y-2)=0)$ or $(Q(x, y-1)=0)$ or $(Q(x, y+1)=0)$ or $(Q(x, y+2)=0))Q2(x, y)=0$ $$\text{else } Q2(x, y)=1 \tag{10}$$

The threshold value Th is set to a value half of a cycle of halftone dots used for the halftone image, or equal to or more than a half of the cycle of the halftone dots. Through the aforementioned processing, when black areas of small shapes such as halftone dot areas are adjacent to each other at a narrow interval, the image separation section 30 sets these black areas as one connected area.

Next, the image separation section 30 measures longitudinal and horizontal lengths of each connected black area. If the longitudinal and horizontal lengths are equal to or more than predetermined values, the image separation section 30 determines a halftone area. If the longitudinal and horizontal lengths are not equal to or more than the predetermined values, the image separation section 30 determines a character/line drawing area.

That is, a character or a line drawing is constituted of line elements. Accordingly, the longitudinal and horizontal lengths become equal to or less than the predetermined values. The halftone area has lengths of certain levels or more in both longitudinal and horizontal directions. Thus, the image separation section 30 can determine the halftone area by the above determination conditions. As a result, for example, the image separation section 30 outputs determination signals in which a pixel determined to be a halftone area is "1" and other pixels are "0".

Each of FIGS. 7A and 7B shows a determination example of a halftone area. A black area $K_1$ shown in FIG. 7A has a horizontal size equal to or less than a predetermined threshold value $T_L$. Thus, the black area $K_1$ is not determined to be a halftone area. On the other hand, a black area $K_2$ shown in FIG. 7B has longitudinal and horizontal sizes each equal to or more than the predetermined threshold value $T_L$. Thus, the black area $K_2$ is determined to be a halftone area.

A mask section 31 masks the halftone area extracted by the image separation section 30 from the image signal P (x, y) output from the image input section 1, and sends an image signal P (x, y) of an unmasked area to the spectral analysis section. That is, the mask section 31 masks the image signal P (x, y) in accordance with the determination signal output from the image separation section 30. If the determination signal output from the image separation section 30 is "1" (halftone area), the mask section 30 forcibly sets the image signal P (x, y) to "0". If the determination signal output from the image separation section 30 is "0", the mask section 31 directly outputs the image signal P (x, y). Accordingly, a halftone dot component of the halftone area is removed from the image signal P (x, y).

Next, a reproduction operation of the embedded data by apparatus thus configured will be described.

The image input section 1 reads an image having embedded data embedded therein, and outputs an image signal of the read image.

The image separation section 30 receives the image signal output from the image input section 1. The image separation section 30 extracts a halftone area such as a photo or a chart in which a tone is represented by halftone dots. For example, the image separation section 30 separates the halftone area by using the smearing method. For example, the image separation section 30 outputs determination signals in which a pixel determined to be a halftone area is set to "1" and other pixels are set to "0".

The mask section 31 masks the halftone area extracted by the image separation section 30 from the image signal output from the image input section 1, and sends an image signal of an unmasked area to the spectral analysis section. That is, the mask section 31 forcibly sets the image signal to "0" if the determination signal output from the image separation section 30 is "1". Thus, the halftone dot component of the halftone area is removed from the image signal. The mask section 31 directly outputs the image signal if the determination signal output from the image separation section 30 is "0".

The spectral analysis section 2 receives the image signal output from the mask section 31, and executes spectral analysis for the image signal P (x, y) as in the case of the first embodiment. The spectral analysis section 2 outputs spectral signals F (uk, vk) of the spectral analysis.

The data extraction section 4 reads the spatial frequencies (uk, vk) from the embedding frequency memory 3 in accordance with k (k=1 to 16), and obtains spectral signals F (uk, vk) for the read spatial frequencies (uk, vk).

The data extraction section 4 compares the spectral signals F (uk, vk) output from the spectral analysis section 2 with a predetermined threshold value T. The data extraction section 4 sets data to "1" if the spectral signals F (uk, vk) are larger than the threshold value T, and sets data to "0" if the spectral signals F (uk, vk) are smaller than the threshold value T. Then, the data extraction section 4 arrays 16 data "1" or "0" of k=1 to 16 to reproduce 16-bit embedded data.

As described above, according to the second embodiment, the halftone dot components are removed from the halftone area by the image separation section 30 and the mask section 31. That is, the halftone area such as a photo or a chart in which a tone is represented by halftone dots is removed from the image signal. Thus, even when a halftone of a chart or a photo is contained in the image signal, erroneous recognition of a halftone dot spectral component as embedded data by the spectral analysis section 2 can be prevented. As a result, by using the data reproduce apparatus of the embodiment, it is possible to embed data even in a document including a halftone.

Next, a third embodiment of the present invention will be described with reference to the drawings. Sections similar to those of FIG. 6 are denoted by similar reference numerals, and detailed description thereof will be omitted.

FIG. 8 is a block diagram of an embedded data reproduction apparatus. As in the case of the second embodiment, for example, an image separation section 30 outputs determination signals in which a pixel determined to be a halftone area is set to "1" and other pixels are set to "0". These determination signals are sent to a spectral analysis section 32.

As in the case of the first embodiment, the spectral analysis section 32 receives an image signal output from an image input section 1. As shown in FIG. 5, the spectral analysis section 2 divides an image of the image signal into a plurality of blocks, e.g., 16 blocks "1" to "16". Next, the spectral analysis section 2 executes Fourier transformation for an image of each of the blocks "1" to "16".

If all or most of the blocks "1" to "16" are halftone areas, no data has been embedded in the blocks "1" to "16". Accordingly, even when spectral analysis is carried out for the blocks "1" to "16", no significant spectral data can be extracted. Not only processing is useless but also accuracy of data extraction is reduced.

Figure 9:
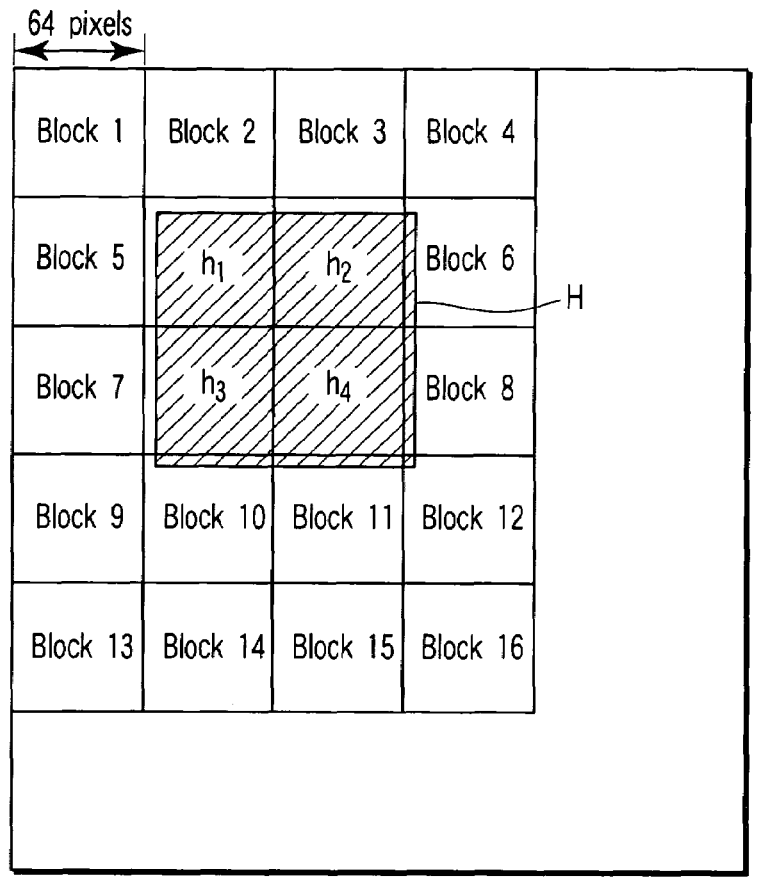
FIG. 9 is a schematic diagram showing each block having a halftone area for which spectral analysis is not carried out.

Therefore, the spectral analysis section 32 does not execute spectral analysis for the blocks "1" to "16" having halftone areas extracted by the image separation section 30. FIG. 9 is a schematic diagram of each block having a halftone area for which spectral analysis is not executed. An area H includes blocks $h_1$ to $h_4$ having halftone areas. The spectral analysis section 32 does not execute spectral analysis for the blocks $h_1$ to $h_4$.

To compare FIG. 5 with FIG. 9, there are four blocks $h_1$ to $h_4$ for which no spectral analysis is carried out in FIG. 9. Accordingly, the four blocks $h_1$ to $h_4$ are omitted from the blocks "1" to "16" shown in FIG. 5. The spectral analysis section 32 adds four new blocks similar to those of FIG. 9 to create 16 blocks "1" to "16".

The spectral analysis section 32 executes spectral analysis for each of the blocks "1" to "16" including the four new blocks to obtain an average value of spectral frequencies thereof. That is, the spectral analysis section 32 calculates a square of an absolute value for each frequency which is a result of Fourier transformation by the equations (5) and (6). Next, the spectral analysis section 32 calculates an average value F (u, v) of the spectral frequencies calculated for the blocks "1" to "16" by the equation (7). The spectral analysis section 32 outputs a calculation result of the average value F (u, v) as a spectral signal.

As described above, according to the third embodiment, for example, the determination signal of the halftone area output from the image separation section 30 is sent to the spectral analysis section 32. Thus, the spectral analysis is carried out after the halftone area is removed. Therefore, it is possible to reproduce frequency data alone of a line edge without being influenced by the halftone dot spectral component included in the halftone area.

Next, a fourth embodiment of the present invention will be described with reference to the drawings. Sections similar to those of FIG. 6 are denoted by reference numerals, and detailed description thereof will be omitted.

Figure 10:
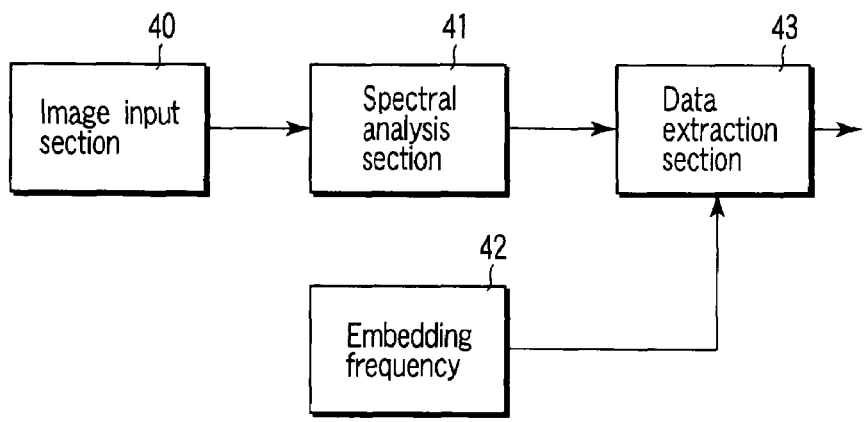
FIG. 10 is a block diagram showing an embedded data reproduction apparatus according to a fourth embodiment of the present invention.

FIG. 10 is a block diagram of an embedded data reproduction apparatus. This embedded data reproduction apparatus targets an image having a redundant spectral component embedded therein. Even when there is a spectral peak originally present in the image, the embedded data reproduction apparatus highly accurately reproduces the image without being influenced by this spectrum.

An image input section 40 reads an image having embedded data embedded therein, and outputs an image signal of the image. For example, the image input section 40 has a scanner or the like. A redundant spectrum has been embedded in the read image. That is, two frequency spectra are assigned to one bit. If a bit is "0", one frequency spectrum is embedded. If a bit is "1", the other frequency component spectrum is embedded.

Now, description will be made of an image having embedded data embedded therein to be a premise for reproduction carried out by the embedded data reproduction apparatus. As a configuration of a data embedding device thereof is similar to that of the block diagram of FIG. 2, this drawing will be used.

An image input from the image input section may contain data of a frequency roughly equal to that of the superimposed signal Q (x, y) generated by the modulation section 23. In this case, it is difficult to determine whether the frequency of the image is a frequency component of embedded data or a frequency component originally present in the image.

To solve this problem, the modulation section 23 has plural groups of frequencies, each group consisting of two frequencies corresponding to each value of the embedded data. The modulation section 23 generates a superimposed signal Q (x, y) having embedded data superimposed therein by one of the frequencies of one group in accordance with each value of the embedded data.

Figures 11, 12:
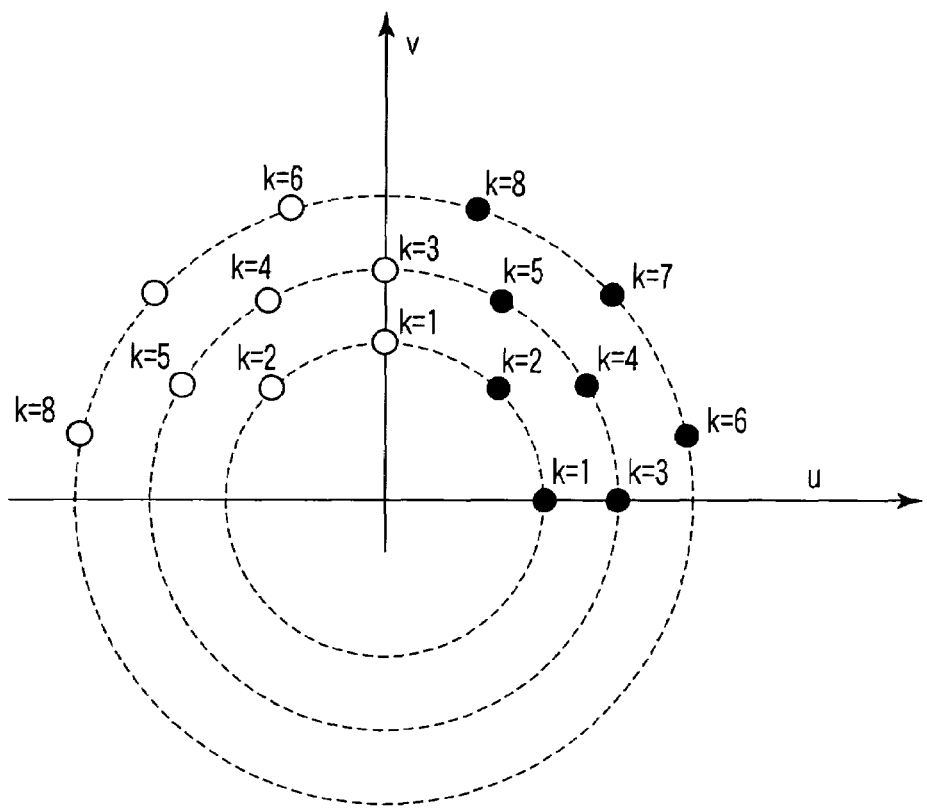
FIG. 11 is an arrangement diagram showing frequency components of sine waves of embedded data.
FIG. 12 is a table showing correspondence among the frequency components of the sine waves of the embedded data.

Specifically, the modulation section 23 assigns a group of two frequencies corresponding to 1 bit of the embedded data. For example, (u1, u2) are assigned corresponding to 1 bit of the embedded data. The frequency u1 is used when the embedded data is "0". The frequency u2 is used when the embedded data is "1". FIG. 11 is an arrangement diagram of frequency components of sine waves embedded by the modulation section 23. FIG. 12 shows correspondence among the frequency components.

In FIG. 11, a black circle "●" indicates one frequency. A white circle "○" indicates the other frequency. The black circle "●" and the white circle "○" constitute one group. For example, if a k-th bit of the embedded data is "0", (u1, v1)=(100, 0) is established. If a bit is 1, (u1, v1)=(0.100) is established. As can be understood from FIGS. 11 and 12, two frequencies having absolute values equal to each other and angles shifted from each other by 90° are assigned as one group.

Generally, frequency components of a document image read by the image input section 1 are point-symmetrical in many cases. On such a premise, a group consisting of two frequencies is assigned corresponding to 1 bit of the embedded data. When such a premise is difficult to be established, the arrangement of a group consisting of two frequencies corresponding to 1 bit of the embedded data may be changed.

The modulation section 23 obtains a superimposed signal Q (x, y) by the equation (2) as in the case of the embedding operation of the embedded data of the first embodiment.

In FIG. 10, a spectral analysis section 41 executes spectral analysis for an image signal output from the image input section 40. First, the spectral analysis section 41 divides an image of the image signal into a plurality of blocks, e.g., blocks "1" to "16", as in the case of the first embodiment. For example, each of the bocks "1" to "16" is a square of 64 pixels×64 pixels. The spectral analysis section 41 executes spectral analysis, i.e., Fourier transformation, for an image of each of the blocks "1" to "16". The spectral analysis section 41 calculates a square of an average value F (u, v) of spectral frequencies, and outputs the average value F (u, v) as a spectral signal.

An embedding frequency memory 42 stores a parameter used for embedding in the image, i.e., spatial frequency data used for embedding the embedded data in the image, as known information. In other words, for example as shown in FIGS. 11 and 12, the embedding frequency memory 42 stores spatial frequency data (u1k, v1k) (u2k, v2k) of 8 groups in a table form.

A data extraction section 43 extracts the embedded data from the spectral signals F (u, v) by using the spatial frequency data (u1k, v1k) (u2k, v2k) stored in the embedding frequency memory 42. According to the embodiment, the embedded data is set to 8 bits. As shown in FIG. 11, two embedding frequencies (u1k, v1k) and (u2k, v2k) are assigned to an 8-th bit from K=1.

The data extraction section 4 calculates a difference of spectral strength between the two embedding frequencies (u1k, v1k) and (u2k, v2k). If a difference is positive, the data extraction section 43 sets data of bitk to "1". The data extraction section 43 determines data of bitk to be "0" if a difference is negative. Data Tk of bitk is represented by the following equation:

$$Fd = F(u1k, v1k) - F(u2k, v2k) \quad (11)$$

if (Fd≧0) Tk=1
if (Fd<0) Tk=0

The data extraction section 43 arrays 8 data "1" or "0" of k=1 to 8 to reproduce 8-bit embedded data.

Next, the reproducing operation of the embedded data by the apparatus thus configured will be described.

The image input section 40 reads an image having redundant spectral embedded data embedded therein to output an image signal thereof.

The spectral analysis section 41 receives the image signal output from the image input section 40, and divides the image of the image signal into a plurality of blocks, e.g., 16 blocks of "1" to "16". The spectral analysis section 41 executes Fourier transformation for an image of each of the blocks "1" to "16". The spectral analysis section 41 calculates a square of an absolute value for each frequency which is a result of the Fourier transformation by the equations (5) to (7). The spectral analysis section 41 calculates an average value F (u, v) of spectral frequencies, and outputs the average value F (u, v) as a spectral signal.

The data extraction section 43 extracts the embedded data from the spectral signal F (u, v) by using the spatial frequency data (u1k, v1k) and (u2k v2k) stored in the embedding frequency memory 42. The data extraction section 43 calculates a difference of spectral strength between the two extracted embedding frequencies (u1k, v1k) and (u2k, v2k) by the equation (11). The data extraction section 43 sets data of bitk to "1" if a difference is positive. The data extraction section 43 determines data of bitk to be "0" if a difference is negative. The data extraction section 43 arrays 8 data "1" or "0" of k=1 to 8 to reproduce 8-bit embedded data.

As described above, according to the fourth embodiment, the difference of spectral strength between the two embedding frequencies (u1k, v1k) is calculated, the data of bitk is set to "1" if the difference is positive, and the data of bitk is determined to be "0" if the difference is negative to reproduce the embedded data. As a result, an influence of a frequency originally present in the image can be removed. In other words, spectral strength of each frequency is higher for an image of a large amount of characters than for an image of a small amount of characters.

Therefore, according to the determination method using strength of a single frequency component as in the case of the first embodiment, a probability of erroneously determining a bit that is originally "0" to be "1" for the image of a large amount of characters, and a bit that is originally "1" to be "0" for the image of a small amount of characters is increased. Setting of a proper threshold value may create a possibility of sufficiently reducing the erroneous determination. However, an optimal threshold value is difficult to be designed as it depends on a document type or a response of an image reader.

If determination is made based on sizes of two frequency components as in the case of the embodiment, an influence of a frequency component originally present in an image can be greatly canceled. As a result, the embedded data can be highly accurately reproduced. There is also an advantage that threshold value designing is easy.

Next, a fifth embodiment of the present invention will be described.

According to the embodiment, the calculation method of the data extraction section 43 of the fourth embodiment is changed. The data extraction section 43 sets a predetermined threshold value Th represented by the following equation (12). The data extraction section 43 makes determination to establish Tk=-1 if a spectral difference between the two frequencies is between Th to -Th.

$$Fd = F(u1k, v1k) - F(u2k, v2k) \quad (12)$$

if (Fd≧Th) Tk=1
if (Th>Fd>-Th) Tk=-1
if (Fd≦-Th) Tk=0

Tk=−1 indicates that no data has been embedded. When one of K=1 to 8 is Tk=−1, the data extraction section 43 determines that there is no embedded data.

Thus, according to the fifth embodiment, it is possible to not only reproduce the embedded data but also determine presence of embedded data.

Next, a sixth embodiment of the present invention will be described with reference to the drawings.

Figure 13:
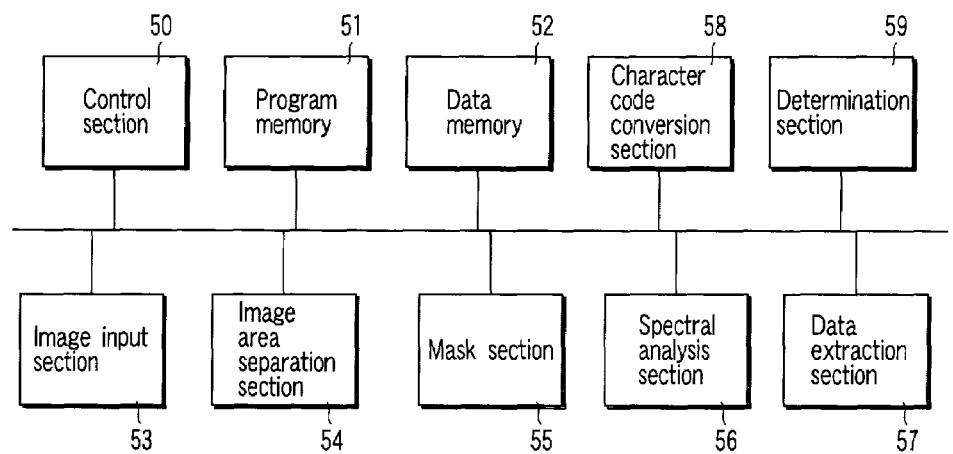
FIG. 13 is a configuration diagram showing a falsification detector according to a sixth embodiment of the present invention.

FIG. 13 is a configuration diagram of a falsification detector. A control section 50 has a CPU. A program memory 51 and a data memory 52 are connected to the control section 50. The control section 50 issues operation commands to an image separation section 54, a mask section 55, a spectral analysis section 56, a data extraction section 57, a character code conversion section 58, and a determination section 59.

Figure 14:
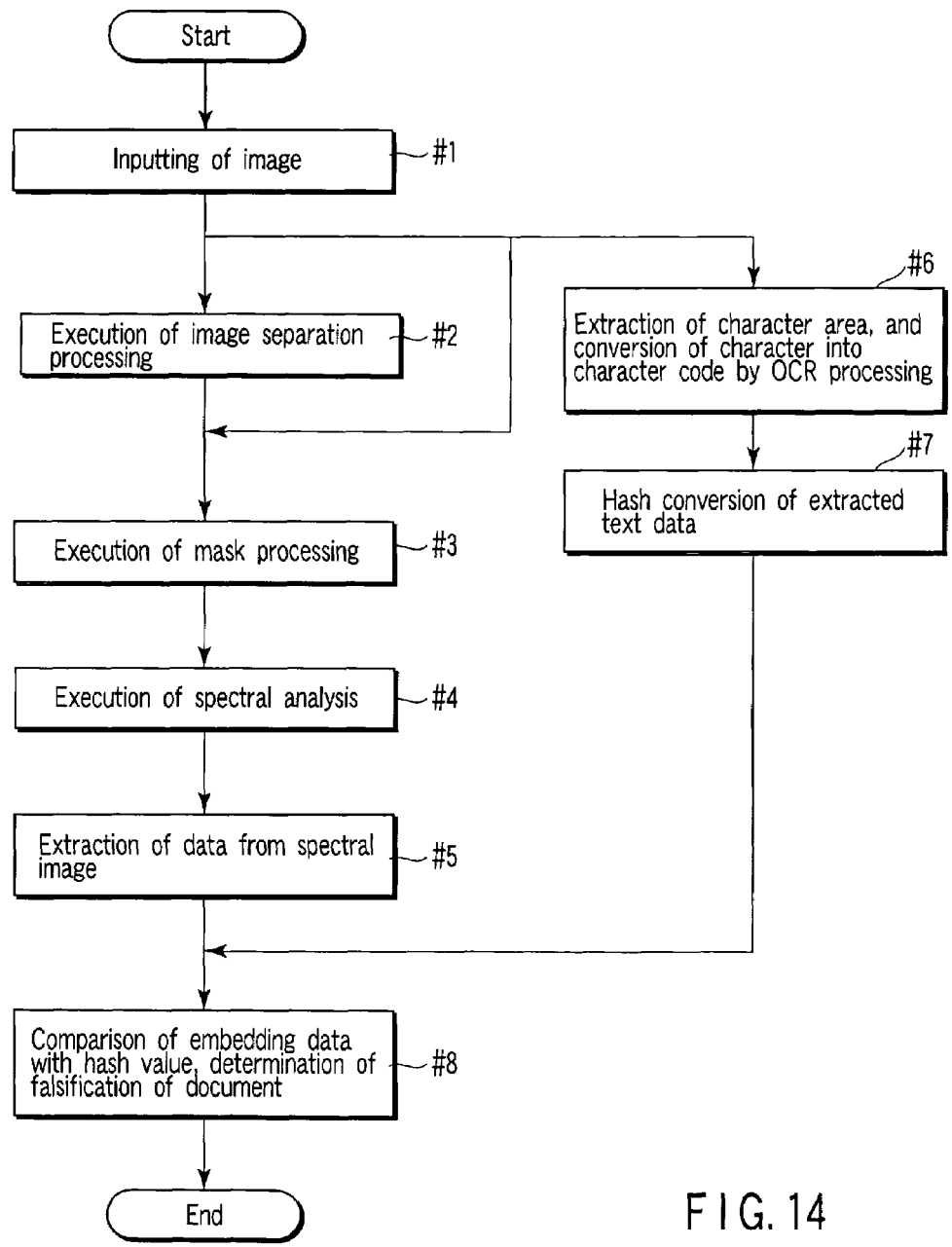
FIG. 14 is a flowchart showing falsification detection processing.

The program 51 prestores a program for detecting image falsification. For example, the program of falsification detection describes commands or the like for executing processing in accordance with falsification detection processing flowchart of FIG. 14.

Data such as image data is temporarily stored in the data memory 52.

The image input section 53 reads an image having embedded data embedded therein, and outputs an image signal of the image. The image input section 53 reads an image containing embedded data having at least two frequency components embedded therein, and outputs an image signal of the image. For example, the image input section 53 has a scanner for reading an image.

In this case, an original image read by the image input section 53 is created by embedding a hash value of a character code of a document. That is, text data is extracted as code data from a document file containing the original image. The code data becomes embedded data. A hash value is calculated based on the extracted text code data. The hash value is data uniquely generated by the text code data. For example, the hash value is obtained by exclusive OR of all the character codes. Here, for example, the hash value is set to 16 bits. The hash value is embedded in, e.g., a bitmap image. The embedding of the hash value is carried out by, e.g., the data embedding device shown in FIG. 2.

The image separation section 54 extracts a halftone area from an image file output from the image input section 53.

The mask section 55 masks the halftone area extracted by the image separation section 54 from the image file output from the image input section 53, and sends an unmasked image file to the spectral analysis section 56.

The spectral analysis section 56 executes spectral analysis for the image file output from the mask section 55.

The data extraction section 57 extracts embedded data embedded in the image file based on a result of the spectral analysis by the spectral analysis section 56 and preset data.

The character code conversion section 58 extracts a character code from the image file output from the image input section 53, and converts the character area into a character code.

The determination section 59 determines falsification of the image based on the embedded data extracted by the data extraction section 57 and the character code obtained by the character code conversion section 58.

Next, falsification detection of the apparatus thus configured will be described.

First, in step #1, the image input section 53 reads an image having embedded data embedded therein by, e.g., the image reading scanner, and outputs an image signal of the image file. As described above, the read image is created by embedding a hash value of a character code of a document. The image file output from the image input section 53 is stored in the data memory 52.

Next, in step #2, the image separation section 54 extracts a halftone area from the image file output from the image input section 53. The halftone area is an image area such as a photo or a chart in which a tone is represented by halftone dots. For a separation method of the halftone area, for example, a smearing method is used. The image separation section 54 creates a determination image file from the image file from which the halftone area has been extracted.

Next, in step #3, the mask section 55 masks the image signal output from the image input section 53 by the determination image file created by the image separation section 54. The mask section 55 sends a file unmasked by the determination image file, i.e., a mask image file, to the spectral analysis section 56.

Next, in step #4, the spectral analysis section 56 executes spectral analysis for the mask image file output from the mask section 55. That is, as in the case of the first embodiment, for example as shown in FIG. 5, the spectral analysis section 2 divides the image of the image file into 16 blocks "1" to "16". Next, the spectral analysis section 2 executes Fourier transformation of an image of each of the blocks "1" to "16". Subsequently, the spectral analysis section 2 calculates a square of an absolute value of each frequency which is a result of the Fourier transformation by the equations (5) and (6). Then, the spectral analysis section 2 calculates an average value F (u, v) of the spectral frequencies calculated for the blocks "1" to "16" by the equation (7). The spectral analysis section 2 outputs a calculation result of the average value F (u, v) as a spectral signal.

Next, in step #5, as in the case of the first embodiment, the data extraction section 57 reads spatial frequencies (uk, vk) from the embedding frequency memory 3 in accordance with k (k=1 to 16). The data extraction section 57 obtains spectral signals F (uk, vk) of the read spatial frequencies (uk, vk). Subsequently, the data extraction section 57 compares the spectral signals F (uk, vk) output from the spectral analysis section 56 with a predetermined threshold value T. As a result of the comparison, the data extraction section 57 sets the data to "1" if the spectral signals F (uk, vk) are larger than the threshold value T. The data extraction section 57 sets the data to "0" if the spectral signals F (uk, vk) are smaller than the threshold value T. Then, the data extraction section 57 arrays 16 data "1" or "0" of k=1 to 16 to reproduce 16-bit embedded data.

In step #6, the character code conversion section 58 extracts a character area from the image file output from the image input section 53, and converts the character area into a character code. The conversion into the character code is by a general technology called an optical character recognition method (OCR), and detailed description thereof will be omitted.

Next, in step #7, the character code conversion section 58 calculates a hash value from all the character codes. The hash value is uniquely decided from all the character codes by predetermined conversion mapping. In this case, the hash value is set to a 2-byte length, i.e., 16-bit length.

It is to be noted that the character code conversion section 58 executes the operations of the steps #6, #7 in parallel with those of the steps #2 to #5.

Next, in step #8, the determination section 59 determines falsification of the image based on the embedded data extracted by the data extraction section 57 and the character code obtained by the character code conversion section 58. That is, the determination section 59 compares the hash value calculated from the character code with the data embedded in the image. As a result of the comparison, the determination section 59 determines falsification of the image if the hash value is different from the data embedded in the image. If the hash value is equal to the data embedded in the image, the determination section 59 determines a nonfalsified normal document.

Thus, according to the sixth embodiment, the falsification of the image is determined based on the embedded data of the image file and the character code into which the character area extracted from the image file has been converted. If there is no falsification, the embedded data is equal to the character code. However, for example, when a character is deleted/added, or replaced, the character code is changed.

The hash value reproduced from the character code is changed with a very high probability. For example, in the case of a 16-bit hash value, it is established at 65535/65536=99.9905%. Accordingly, falsification can be surely determined if a document file has been falsified. As a result, it is possible to determine authenticity of the document file.

According to the sixth embodiment, the image separation section 54 and the mask section 55 are not always necessary. In this case, as in the case of the first embodiment, the spectral analysis section 56 executes spectral analysis for the image signal output from the image input section 53. The data extraction section 57 extracts the embedded data embedded in the image file based on a result of the spectral analysis by the spectral analysis section 56 and preset data. The character code conversion section 58 extracts the character area from the image file output from the image input section 53, and converts the character area into a character code. The determination section 59 determines falsification of the image based on the embedded data extracted by the data extraction section 57 and the character code obtained by the character conversion section 58.

As described above with reference to the fourth embodiment, an image having a redundant spectral component may be targeted. In this case, the image input section 53 reads an image containing embedded data having two frequency components embedded therein to output an image signal.

The data extraction section 57 extracts embedded data from one of at least two frequency components embedded in the image file based on the result of the spectral analysis by the spectral analysis section 56 and the preset data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An embedded data reproduction apparatus comprising:
   an image input section which reads an image having embedded data embedded therein, and outputs an image signal of the image;
   a spectral analysis section which executes spectral analysis for the image signal output from the image input section;
   a data extraction section which extracts the embedded data embedded in the image signal based on a result of the spectral analysis by the spectral analysis section and preset data;
   an image separation section which extracts a halftone area from the image signal output from the image input section; and
   a mask section which masks the halftone area extracted from the image signal output from the image input section by the image separation section, and sends the image signal of an unmasked area to the spectral analysis section.

2. The embedded data reproduction apparatus according to claim 1, wherein the spectral analysis section divides the image of the image signal into a plurality of blocks, and executes the spectral analysis for each of the plurality of blocks to obtain an average value among spectral frequencies of the blocks.

3. The embedded data reproduction apparatus according to claim 1, wherein the data extraction section includes a memory to store spatial frequency data used as the preset data for embedding the embedded data in the image, and extracts the embedded data embedded in the image signal based on the spatial frequency data.

4. The embedded data reproduction apparatus according to claim 3, wherein the data extraction section reads the spatial frequency data from the memory in accordance with the result of the spectral analysis to obtain a spectral signal, compares the spectral signal with a preset threshold value, and extracts the embedded data of a plurality of bits in accordance with a result of the comparison.

5. The embedded data reproduction apparatus according to claim 4, wherein the data extraction section is configured to vary the threshold value in accordance with the spatial frequency.

6. The embedded data reproduction apparatus according to claim 1, wherein the image separation section extracts an image area having the tone represented by halftone dots as the halftone area.

7. The embedded data reproduction apparatus according to claim 1, wherein the spectral analysis section divides the image of the image signal into a plurality of blocks, and executes the spectral analysis for each of the other blocks while executing no spectral analysis for a block having the halftone area extracted by the image separation section to obtain an average value of spectral strength among the blocks for each frequency.

8. The embedded data reproduction apparatus according to claim 1, wherein:
   the image input section reads an image containing embedded data having at least two frequency components embedded therein, and outputs an image signal of the image,
   the spectral analysis section executes spectral analysis for the image signal output from the image input section, and
   the data extraction section extracts the embedded data from one of at least the two frequency components embedded in the image signal based on a result of the spectral analysis by the spectral analysis section and preset data.

9. The embedded data reproduction apparatus according to claim 8, wherein the data extraction section obtains a difference of spectral strength between at least the two frequency components embedded in the image signal, and extracts the embedded data of a plurality of bits based on a value of the difference.

10. A falsification detector comprising:
    an image input section which reads an image having embedded data embedded therein, and outputs an image signal of the image;
    a spectral analysis section which executes spectral analysis for the image signal output from the image input section;

a data extraction section which extracts the embedded data embedded in the image signal based on a result of the spectral analysis by the spectral analysis section and preset data;

a character code conversion section which extracts a character area from the image signal output from the image input section, and converts the character area into a character code; and a determination section which determines falsification of the image based on the embedded data extracted by the data extraction section and the character code obtained by the character code conversion section.

11. The falsification detector according to claim 10, further comprising:

an image separation section which extracts a halftone area from the image signal output from the image input section; and a mask section which masks the halftone area extracted from the image signal output from the image input section by the image separation section, and sends the image signal of an unmasked area to the spectral analysis section.

12. The falsification detector according to claim 11, wherein the spectral analysis section executes spectral analysis for the image signal output from the mask section.

13. The falsification detector according to claim 10, wherein:

the image input section reads an image containing embedded data having at least two frequency components embedded therein, and outputs an image signal of the image, the spectral analysis section executes spectral analysis for the image signal output from the image input section, and the data extraction section extracts the embedded data from one of at least the two frequency components embedded in the image signal based on a result of the spectral analysis by the spectral analysis section and preset data.

14. The falsification detector according to claim 10, wherein the spectral analysis section divides the image of the image signal into a plurality of blocks, and executes the spectral analysis for each of the plurality of blocks to obtain an average value among spectral frequencies of the blocks.

15. The falsification detector according to claim 10, wherein the data extraction section includes a memory to store spatial frequency data used as the preset data for embedding the embedded data in the image, and extracts the embedded data embedded in the image signal based on the spatial frequency data.

16. The falsification detector according to claim 15, wherein the data extraction section reads the spatial frequency data from the memory in accordance with the result of the spectral analysis to obtain a spectral signal, compares the spectral signal with a preset threshold value, and extracts the embedded data of a plurality of bits in accordance with a result of the comparison.

17. The falsification detector according to claim 16, wherein the data extraction section is configured to vary the threshold value in accordance with the spatial frequency.

18. The falsification detector according to claim 11, wherein the image separation section extracts an image area having the tone represented by halftone dots as the halftone area.

19. The falsification detector according to claim 11, wherein the spectral analysis section divides the image of the image signal into a plurality of blocks, and executes the spectral analysis for each of the other blocks while executing no spectral analysis for a block having the halftone area extracted by the image separation section to obtain an average value of spectral strength among the blocks for each frequency.

20. The falsification detector according to claim 10, wherein:

the image input section reads an image containing embedded data having at least two frequency components embedded therein, and outputs an image signal of the image, the spectral analysis section executes spectral analysis for the image signal output from the image input section, and the data extraction section extracts the embedded data from one of at least the two frequency components embedded in the image signal based on a result of the spectral analysis by the spectral analysis section and preset data.

* * * * *